(12) United States Patent
Kihara et al.

(10) Patent No.: US 9,112,220 B2
(45) Date of Patent: Aug. 18, 2015

(54) NICKEL HYDROGEN RECHARGEABLE BATTERY

(75) Inventors: Masaru Kihara, Takasaki (JP); Masaaki Takei, Takasaki (JP); Tetsuya Yamane, Takasaki (JP)

(73) Assignee: FDK CORPORATION, Tokyo (JP)

( * ) Notice: Subject to any disclaimer, the term of this patent is extended or adjusted under 35 U.S.C. 154(b) by 381 days.

(21) Appl. No.: 13/559,290

(22) Filed: Jul. 26, 2012

(65) Prior Publication Data
US 2013/0029209 A1 Jan. 31, 2013

(30) Foreign Application Priority Data

Jul. 28, 2011 (JP) .................................. 2011-165320

(51) Int. Cl.
| | |
|---|---|
| H01M 4/32 | (2006.01) |
| C22C 19/03 | (2006.01) |
| H01M 4/24 | (2006.01) |
| H01M 4/36 | (2006.01) |
| H01M 4/38 | (2006.01) |
| H01M 4/52 | (2010.01) |
| H01M 4/62 | (2006.01) |
| H01M 10/34 | (2006.01) |
| C01B 3/00 | (2006.01) |
| C22C 1/02 | (2006.01) |
| C22C 19/00 | (2006.01) |
| C22C 28/00 | (2006.01) |
| C22C 1/04 | (2006.01) |

(52) U.S. Cl.
CPC .............. *H01M 4/32* (2013.01); *C01B 3/0057* (2013.01); *C22C 1/02* (2013.01); *C22C 1/023* (2013.01); *C22C 1/0433* (2013.01); *C22C 19/00* (2013.01); *C22C 19/03* (2013.01); *C22C 28/00* (2013.01); *H01M 4/242* (2013.01); *H01M 4/362* (2013.01); *H01M 4/383* (2013.01); *H01M 4/52* (2013.01); *H01M 4/624* (2013.01); *H01M 10/345* (2013.01); *Y02E 60/124* (2013.01); *Y02E 60/327* (2013.01)

(58) Field of Classification Search
CPC ....... H01M 4/242; H01M 4/32; H01M 4/383; H01M 10/345; H01M 4/362; Y02E 60/124; Y02E 60/327
See application file for complete search history.

(56) References Cited

U.S. PATENT DOCUMENTS

| | | |
|---|---|---|
| 2003/0096166 A1 | 5/2003 | Imoto et al. |
| 2004/0209166 A1 | 10/2004 | Kihara |

(Continued)

FOREIGN PATENT DOCUMENTS

JP  2007-149646 A  6/2007

OTHER PUBLICATIONS

Extended European Search Report for EP 12 17 7534, dated Nov. 14, 2012.

*Primary Examiner* — Laura Weiner
(74) *Attorney, Agent, or Firm* — Marshall, Gerstein & Borun LLP

(57) ABSTRACT

A nickel hydrogen rechargeable battery has a positive electrode and a negative electrode. The positive electrode includes positive-electrode active material made of nickel hydroxide particles in which magnesium is dissolved, and the negative electrode includes rare earth-Mg—Ni-based hydrogen storage alloy powder. At least either one of the negative and positive electrodes includes as additive at least one selected from a group including zinc and zinc compounds. The content of the additive ranges from 0.2 to 1.5 part by weight per 100 parts by weight of hydrogen storage alloy in the negative electrode, and ranges from 0.3 to 1.5 part by weight per 100 parts by weight of positive-electrode active material in the positive electrode.

2 Claims, 3 Drawing Sheets

(56) References Cited

U.S. PATENT DOCUMENTS

2006/0194105 A1 8/2006 Kihara
2007/0065721 A1 3/2007 Kihara et al.
2012/0052353 A1* 3/2012 Sugii et al. .................. 429/94

* cited by examiner

NICKEL HYDROGEN RECHARGEABLE BATTERY

BACKGROUND OF THE INVENTION

1. Field of the Invention

The invention relates to a nickel hydrogen rechargeable battery.

2. Description of the Related Art

Rare earth-Mg—Ni-based hydrogen storage alloy is capable of storing a large amount of hydrogen gas. The use of the rare earth-Mg—Ni-based hydrogen storage alloy in nickel hydrogen rechargeable batteries therefore contributes to the capacity increase of the batteries.

On the other hand, in spite of the high capacity, conventional nickel hydrogen rechargeable batteries using the rare earth-Mg—Ni-based hydrogen storage alloy need to be charged before use if they are stored for a long period of time because remaining capacity is decreased due to their high self-discharge rate. To improve the self-discharge characteristics, there has been considerable research on the batteries in which rare earth-Mg—Ni-based hydrogen storage alloy is used in their negative electrodes in the aim of increasing the capacity. As the result, a self-discharge restrained type of a nickel hydrogen rechargeable battery using the rare earth-Mg—Ni-based hydrogen storage alloy has been developed (see, for example, Unexamined Japanese Patent Publication (Kokai) No. 2007-149646).

As long as being charged beforehand, the battery of the self-discharge restrained type is reduced in remaining capacity at low reduction rate while being stored, so that they reduce the frequency of recharge required before use. With this advantage, the self-discharge restrained type of the nickel hydrogen rechargeable battery with the negative electrode including rare earth-Mg—Ni-based alloy is recognized as a battery that is excellent in terms both of having as good usability as a dry-cell battery and of having as high or higher capacity as a dry-cell battery.

Concerning the self-discharge restrained type of the nickel hydrogen rechargeable battery using the rare earth-Mg—Ni-based hydrogen storage alloy, the inventors examined the condition of the battery after storing the battery for a longer period of time than a conventionally supposed time period, and found that operating voltage was notably decreased in spite that sufficient capacity still remained. If the battery decreased in operating voltage as described is utilized in a device requiring relatively high operating voltage, it causes the problem that the device is unable to be activated even as there still remains battery capacity.

SUMMARY OF THE INVENTION

The inventors searched for a way of preventing decrease in operating voltage after a self-discharge restrained type of a nickel hydrogen rechargeable battery using rare earth-Mg—Ni-based hydrogen storage alloy was stored for a long period of time. In the process of their search, the inventors found that the magnesium was eluted from the rare earth-Mg—Ni-based hydrogen storage alloy contained in a negative electrode reacts with alkaline electrolyte to form magnesium hydroxide in the vicinity of the surface of the hydrogen storage alloy, and that this magnesium hydroxide inhibits a charge-discharge reaction on the surface of the hydrogen storage alloy. As magnesium has very low solubility in electrolyte, the elution of magnesium has not been recognized as a problem. Since magnesium is gradually eluted by small amounts, the decrease of operating voltage, attributable to the elution of magnesium from hydrogen storage alloy, had not been brought to the surface until the inventors stored the battery for a longer period of time than a conventionally supposed time period.

On the basis of this knowledge, the inventors figured that the inhibition of magnesium hydroxide against the charge-discharge reaction on the hydrogen storage alloy surface reduced the operating voltage. The inventors then arrived at the present invention in which the formation of magnesium hydroxide is inhibited to prevent the decrease of operating voltage of the battery after the battery was stored for a longer period of time than the conventionally supposed time period.

More specifically, the nickel hydrogen rechargeable battery of the invention is a nickel hydrogen rechargeable battery in which an electrode group is airtightly contained in a container together with alkaline electrolyte, and the electrode group is formed of a separator, a negative electrode and a positive electrode. The negative electrode includes hydrogen storage alloy having a composition indicated by the general formula, $Ln_{1-w}Mg_wNi_xAl_yT_z$ (wherein Ln represents at least one element selected from lanthanoid, Ca, Sr, Sc, Y, Ti, Zr and Hf; T represents at least one element selected from V, Nb, Ta, Cr, Mo, Mn, Fe, Co, Ga, Zn, Sn, In, Cu, Si, P and B; and subscripts w, x, y and z represent $0<w\le1$, $2.80\le x\le3.50$, $0.10\le y\le0.25$, and $0\le z\le0.5$, respectively). The positive electrode contains positive-electrode active material including nickel hydroxide in which magnesium is dissolved. At least either one of the negative and positive electrodes further contains as additive at least one selected from a group including zinc and zinc compounds. The content of the additive ranges from 0.2 to 1.5 part by weight per 100 parts by weight of the hydrogen storage alloy in the negative electrode, and ranges from 0.3 to 1.5 part by weight per 100 parts by weight of the positive-electrode active material in the positive electrode.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

A nickel hydroxide rechargeable battery (hereinafter referred to simply as a battery) of the present invention will be described below with reference to the attached drawings.

Figure 1:
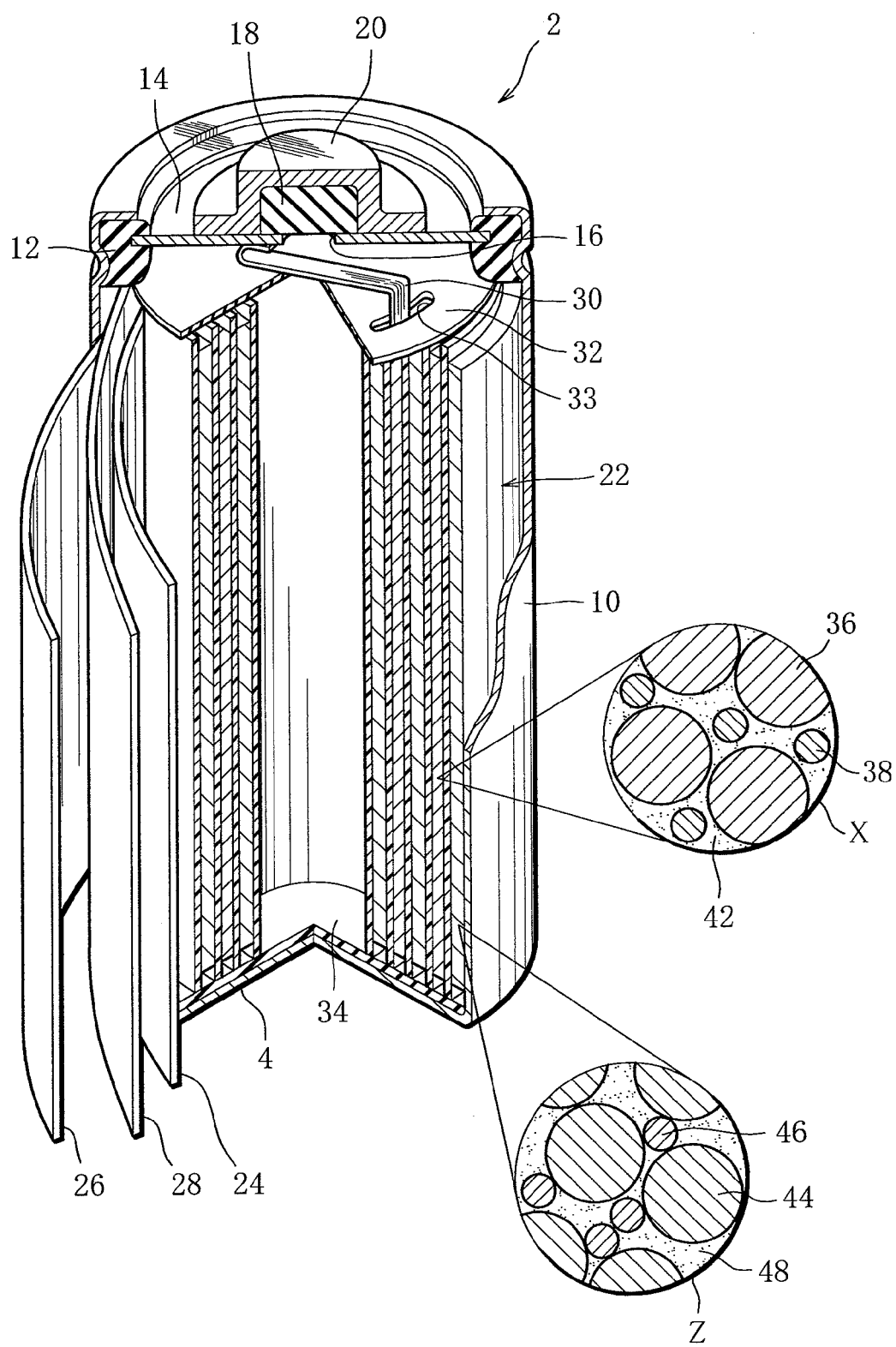
FIG. 1 is a perspective view showing a nickel hydrogen rechargeable battery according to one embodiment of the invention, partially broken away.

Although there is no particular limitation on the battery to which the invention is applied, the description refers to as an example a case in which the invention is applied to an AA-size cylindrical battery 2 shown in FIG. 1.

As shown in FIG. 1, the battery 2 has an outer can 10 in the shape of a bottomed cylinder whose upper end is open. The outer can 10 is conductive and has a bottom wall 4 functioning as a negative terminal. A circular conductive lid plate 14 is situated inside the opening of the outer can 10 with a ring-shaped insulating packing 12 intervening therebetween, which is fitted around the lid plate 14. The lid plate 14 and the insulating packing 12 are fastened to an open end of the outer can 10 by caulking the rim of the open end of the outer can 10. In this way, the lid plate 14 and the insulating packing 12 airtightly seal the open end of the outer can 10 in consort.

The lid plate 14 has a center through-hole 16 in the center thereof. In the outer surface of the lid plate 14, there is disposed a rubber valve element 18 sealing the center through-hole 16. Furthermore, a positive terminal 20 in the shape of a flanged cylinder is fastened onto the outer surface of the lid plate 14 to cover the valve element 18. The positive terminal 20 is provided with a vent hole, not shown. The positive terminal 20 presses the valve element 18 towards the lid plate 14. Usually, therefore, the center through-hole 16 is airtightly sealed with the valve element 18. If gas is generated within the outer can 10, and the internal pressure is increased, the valve element 18 is compressed by the internal pressure and opens the center through-hole 16. In the result, the gas is released from the outer can 10 through the center through-hole 16 and the vent hole of the positive terminal 20. In short, the center through-hole 16, the valve element 18 and the positive terminal 20 function as a safety valve for the battery.

The outer can 10 contains an electrode group 22. The electrode group 22 includes a positive electrode 24, a negative electrode 26 and a separator 28, which are all strip-shaped. The positive electrode 24, the negative electrode 26 and the separator 28 are rolled in a spiral shape so that the separator 28 intervenes between the positive electrode 24 and the negative electrode 26. In other words, the positive electrode 24 and the negative electrode 26 are superimposed together with the separator 28 sandwiched therebetween. The outermost periphery of the electrode group 22 is a part (outermost periphery) of the negative electrode 26. The outermost periphery of the negative electrode 26 is in contact with an inner circumferential wall of the outer can 10. The negative electrode 26 and the outer can 10 are thus electrically connected to each other.

A positive lead 30 is disposed between one end of the electrode group 22 and the lid plate 14 in the outer can 10. The positive lead 30 is connected to the positive electrode 24 at one end, and to the lid plate 14 at the other end. This way, the positive electrode 24 is electrically connected to the positive terminal 20 through the positive lead 30 and the lid plate 14. A circular insulating member 32 is situated between the lid plate 14 and the electrode group 22. The positive lead 30 extends through a slit 33 formed in the insulating member 32. Likewise, a circular insulating member 34 is situated between the electrode group 22 and the bottom of the outer can 10.

A predetermined amount of alkaline electrolyte (not shown) is injected in the outer can 10. The electrode group 22 is impregnated with the alkaline electrolyte, which progresses a charge-discharge reaction between the positive electrode 24 and the negative electrode 26. The alkaline electrolyte is not particularly limited in kind and may be, for example, a sodium hydroxide aqueous solution, a lithium hydroxide aqueous solution, a potassium hydroxide aqueous solution, an aqueous solution prepared by mixing two or more of the above-mentioned aqueous solutions or the like. Likewise, the alkaline electrolyte is not particularly limited in concentration. The concentration may be, for example, 8N (normality).

The separator 28 may be made, for example, of polyamide nonwoven fabric, polyolefin nonwoven fabric, such as polyethylene and polypropylene, provided with a hydrophilic function, etc.

The positive electrode 24 is formed of a conductive positive substrate having a porous structure and a positive mixture held in pores of the positive substrate.

The positive substrate may be, for example, a net-like, sponge-like or fibrous metal body that is plated with nickel.

The positive mixture contains positive-electrode active material particles 36, a positive additive 38 and a binding agent 42 as schematically shown in a circle X in FIG. 1. The positive mixture may contain a conducting material as needed. The binding agent 42 binds the positive-electrode active material particles 36, the positive additive 38 and the conducting material, and also binds the positive mixture to a positive substrate.

The positive-electrode active material particles 36 are nickel hydroxide particles or high-order nickel hydroxide particles, in which magnesium is dissolved. When magnesium is dissolved in the nickel hydroxide of the positive electrode, the magnesium is prevented from being eluted from the rare earth-Mg—Ni-based hydrogen storage alloy of the negative electrode into the electrolyte. More specifically, magnesium has a given solubility in electrolyte. For this reason, after magnesium is eluted from the positive electrode (nickel hydroxide particles in which magnesium is dissolved) into the electrolyte to a given amount, no more magnesium is eluted into the electrolyte. Consequently, the magnesium is prevented from being eluted from the hydrogen storage alloy of the negative electrode, so that magnesium hydroxide is prevented from being generated near the hydrogen storage alloy. In addition, even if the magnesium is transferred from the positive electrode towards the negative electrode, the magnesium is captured by additive mentioned later, and magnesium hydroxide is prevented from being generated on the surface of the hydrogen storage alloy.

Preferably, the content of the magnesium dissolved in the nickel hydroxide particles ranges from 0.4 to 0.6 percent by weight.

It is also preferable that at least either one of cobalt and zinc be also dissolved in the nickel hydroxide particles. Cobalt contributes to improvement in conductivity among the positive-electrode active material particles, and zinc prevents the positive electrode from expanding along with the progress of a charge-discharge cycle and contributes to improvement in cycle life characteristics of the battery.

As to the contents of the above elements dissolved in the nickel hydroxide particles, preferably, the content of the cobalt ranges from 0.4 to 0.9 percent by weight, and that of the zinc from 3.5 to 4.5 percent by weight in relation to the nickel hydroxide.

The positive additive 38 contains at least one selected from a group including zinc and zinc compounds. The positive additive 38 is in the form of particles and distributes among the positive-electrode active material particles 36. The zinc compounds may include zinc carbonate, zinc sulfate, zinc hydroxide, zinc oxide, etc. The positive additive 38 captures the magnesium, albeit a small amount, eluted into the electrolyte, and forms a compound of zinc and magnesium. By so doing, the positive additive 38 prevents the magnesium eluted into the electrolyte from being turned into magnesium hydroxide. For that reason, the positive additive is recognized to inhibit the decrease of operating voltage. The compound of zinc and magnesium is a substance that does not inhibit battery reaction and does not affect battery characteristics even if being formed within the electrolyte.

If the content of the positive additive contained in the positive mixture is less than 0.3 part by weight per 100 parts by weight of the positive-electrode active material, the operating voltage resulted after the battery is stored for a long period of time is not prevented from decreasing. If the content of the positive additive is more than 1.5 part by weight per 100 parts by weight of the positive-electrode active material, this increases the amount of the operating voltage resulted after the battery is stored for a long period of time. In this view, in order to prevent the decrease of operating voltage, it is necessary to set the content of the positive additive to fall in a range from 0.3 to 1.5 part by weight per 100 parts by weight of the positive-electrode active material.

The conducting material may be, for example, one or more that are selected from cobalt compounds including cobalt oxide (CoO), cobalt hydroxide (Co(OH)$_2$) and the like and cobalt (Co). These cobalt compounds may be covered with nickel hydroxide on their surfaces.

The binding agent to be added into the positive mixture may be, for example, carboxymethylcellulose, methylcellulose, PTFE (polytetrafluoroethylene) dispersion, HPC (hydroxypropylcellulose) dispersion or the like.

The positive electrode 24 can be fabricated, for example, in the following manner.

First, positive slurry is prepared, which contains positive-electrode active material powder made of the nickel hydroxide particles 36, the positive additive 38, water, and as needed a conducting material and a binding agent. The positive slurry is dried after being infiltrated into, for example, a sponge-like nickel metal member. After the positive slurry is dried, the metal member filled with the nickel hydroxide particles or the like undergoes a rolling process and a cutting process. This way, the positive electrode 24 is fabricated.

The negative electrode 26 has a conductive negative substrate (core body) having a strip-like shape. The negative mixture is held in the negative substrate.

The negative substrate is made of a sheet-like metal member in which through-holes are distributed. For example, a punching metal sheet or a sintered substrate obtained by subjecting metal powder to a die forming process and a sintering process may be used as the metal member. The negative mixture is not only infiltrated into the through-holes of the negative substrate but also held in a layer on each side of the negative substrate.

As schematically shown in circle Z in FIG. 1, the negative mixture contains hydrogen-storage alloy particles 44 capable of storing and releasing hydrogen serving as a negative-electrode active material, negative additive 46 that contributes to the prevention of decrease of operating voltage resulted after the battery is stored for a long period of time, and a binding agent 48. The negative mixture may further contain a conducting material as needed. The binding agent 48 functions not only to bind the hydrogen storage alloy particles 44, the negative additive 46 and the conducting material together but also to bind the negative mixture to the negative substrate. As the binding agent, hydrophilic or hydrophobic polymer or the like may be used. As the conducting material, carbon black or graphite may be used.

The composition of the hydrogen storage alloy contained in the hydrogen storage alloy particles 44 is shown by a general formula:

$$Ln_{1-w}Mg_wNi_xAl_yT_z \quad (I)$$

In the general formula (I), Ln represents at least one element selected from lanthanoid, Ca, Sr, Sc, Y, Ti, Zr and Hf; T represents at least one element selected from V, Nb, Ta, Cr, Mo, Mn, Fe, Co, Ga, Zn, Sn, In, Cu, Si, P and B; subscripts w, x, y and z represent numbers that meet the inequalities, $0<w\leq1$, $2.80\leq x\leq3.50$, $0.10\leq y\leq0.25$, and $0\leq z\leq0.5$, respectively.

The hydrogen storage alloy particles 44 are obtained, for example, in the following manner.

First, metal raw materials are weighed and mixed together to have a predetermined composition. This mixture is melted, for example, by an induction melting furnace, and then refrigerated into an ingot. The ingot thus obtained is subjected to heat treatment in which the ingot is heated under an inert-gas atmosphere at a temperature of 900 to 1200 degrees centigrade for 5 to 24 hours. The ingot is subsequently pulverized into particles. These particles are subjected to sieve classification to separate desired size particles. The hydrogen storage alloy particles 44 are thus obtained.

The negative additive 46 contains at least one selected from a group including zinc and zinc compounds. The negative additive 46 are in the form of particles, which distribute among the hydrogen storage alloy particles 44. The zinc compounds may include zinc carbonate, zinc sulfate, zinc hydroxide, zinc oxide, etc. Like the positive additive 38, the negative additive 46 captures the magnesium, albeit a small amount, eluted into the electrolyte and forms a compound of zinc and magnesium, thereby preventing the magnesium eluted into the electrolyte from being turned into magnesium hydroxide. For that reason, the negative additive 46 is considered to contribute to the prevention of decrease in operating voltage.

If the content of the negative additive contained in the negative mixture is less than 0.2 part by weight per 100 parts by weight of the hydrogen storage alloy, the operating voltage resulted after the battery is stored for a long period of time is not prevented from decreasing. If the content of the negative additive exceeds 1.5 part by weight per 100 parts by weight of the hydrogen storage alloy, the amount of decrease in the operating voltage resulted after the battery is stored for a long period of time starts increasing. This shows that, to prevent the decrease of operating voltage, it is necessary to set the content of the negative additive within a range from 0.2 to 1.5 part by weight per 100 parts by weight of the hydrogen storage alloy.

According to the invention, the zinc or zinc compounds serving as additive are contained in at least either one of the negative electrode 26 and the positive electrode 24.

The negative electrode 26 can be fabricated, for example, in the following manner.

First, negative slurry is prepared by mixing and kneading hydrogen storage alloy powder made of the hydrogen storage alloy particles 44, the negative additive 46, and as needed, a conducting material, a binding agent and water. The negative slurry thus obtained is applied to the negative substrate and then dried. After the negative slurry is dried, the negative substrate with the hydrogen storage alloy particles 44 and the like attached thereto undergoes a rolling process into predetermined thickness. The negative substrate is then cut into predetermined size. This way, the negative electrode 26 is fabricated.

EMBODIMENTS

1. Production of a Battery

Embodiment 1

(1) Fabrication of a Positive Electrode

While a mixed aqueous solution of nickel sulfate, zinc sulfate, cobalt sulfate and magnesium sulfate was being stirred, a sodium hydroxide aqueous solution was gradually added into this mixed aqueous solution so that the contents of zinc, cobalt and magnesium were 3 percent by weight, 1 percent by weight and 0.4 percent by weight for the content of nickel, to thereby react the mixed aqueous solution. During the reaction, pH was stabilized in a range from 13 to 14, thereby achieving the precipitation of complex particles of nickel hydroxide in which zinc, cobalt and magnesium were dissolved.

The complex particles thus obtained were cleaned three times with 10 parts pure water. The complex particles were then dehydrated and dried. In this way, nickel hydroxide particles serving as the positive-electrode active material 36 were fabricated.

Secondly, 10 parts by weight of cobalt hydroxide, 40 parts by weight of HPC (hydroxypropylcellulose) dispersion, and 0.3 part by weight of zinc oxide (positive additive 38) were mixed into 100 parts by weight of the nickel hydroxide particles obtained as described above, to thereby prepare the positive slurry. The positive slurry was applied onto and infiltrated into nickel foam to be used as a positive substrate. After the positive slurry was dried, the nickel foam holding the positive mixture was subjected to the rolling process and cut into predetermined size, thereby being formed into a positive electrode. In the positive mixture of the positive electrode thus obtained, the positive additive and the powder conducting material exist among the positive-electrode active material particles.

(2) Fabrication of Hydrogen Storage Alloy and a Negative Electrode

A rare-earth component containing 20 percent by weight of lanthanum, 40 percent by weight of praseodymium, and 40 percent by weight of neodymium was prepared. The rare-earth component, magnesium, nickel and aluminum were weighed, to thereby prepare a mixture in a molar ratio of 0.85:0.15:3.15:0.25. The mixture thus obtained was melted in an induction melting furnace and refrigerated into an ingot. The ingot was subjected to heat treatment in which the ingot was heated under an argon-gas atmosphere at a temperature of 1000 degrees centigrade for 10 hours. This produces a hydrogen storage alloy ingot having a composition of $(La_{0.20}Pr_{0.40}Nd_{0.40})_{0.85}Mg_{0.15}Ni_{3.15}Al_{0.25}$. In the next step, the ingot was mechanically pulverized and sieved under an inert-gas atmosphere, thereby separating powder made of hydrogen storage alloy particles classified into a range from 400 to 200 mesh size. The hydrogen storage alloy powder thus obtained was measured in particle size distribution by means of a laser diffraction scattering device for measuring particle size distribution. The average particle diameter of the particles included in 50 percent by weight integral of the hydrogen storage alloy powder was 45 µm.

0.4 part by weight of sodium polyacrylate, 0.1 part by weight of carboxymethylcellulose, 1.0 part by weight (in solid content equivalent) of styrene-butadiene rubber (SBR) dispersion (50 percent by weight in solid content), 1.0 part by weight of carbon black, and 30 parts by weight of water were added into 100 parts by weight of the hydrogen storage alloy powder obtained as described above. The mixture was kneaded into negative slurry.

The negative slurry was applied onto both sides of a metal porous sheet to be used as the negative substrate so as to be uniform and constant in thickness. The porous sheet had a thickness of 60 µm and was plated with nickel in surface thereof.

After the slurry was dried, the porous sheet with the hydrogen storage alloy powder attached thereto was further subjected to the rolling process and was then cut into the negative electrode 26 for an AA-size battery. The content of hydrogen storage alloy per negative electrode was designed to be 9.0 grams.

(3) Assembly of a Nickel-Hydrogen Rechargeable Battery

The positive and negative electrodes 24 and 26 obtained in the above-described manner were rolled in a spiral shape with the separator 28 intervening therebetween, to thereby fabricate the electrode group 22. The separator 28 used for fabricating the electrode group 22 was made of polypropylene nonwoven fabric and had a thickness of 0.1 mm (40 $g/m^2$ in fiber density).

The electrode group 22 was placed in the outer can 10 having the shape of a bottomed cylinder, and alkaline electrolyte was injected into the outer can 10. Used as the alkaline electrolyte injected in the outer can 10 was 8N (normality) alkaline electrolyte including 30 percent by weight of a sodium hydroxide aqueous solution containing lithium and potassium. The opening of the outer can 10 was sealed with the lid plate 14 and the like. An AA-size nickel hydrogen rechargeable battery 2 having a nominal capacity of 2000 mAh was thus assembled. This nickel hydrogen rechargeable battery is referred to as battery A1.

Embodiments 2 to 4

Nickel hydrogen rechargeable batteries (batteries B1, C1 and D1) were assembled in the same manner as the battery A1 of Embodiment 1, except that when positive electrodes were fabricated, the contents of zinc oxide mixed into positive slurry were set at 0.5, 1.0, and 1.5 part by weight as shown in TABLE 1.

Comparative Examples 1 to 6

Nickel hydrogen rechargeable batteries (batteries E1, F1, G1, H1, I1 and J1) were assembled in the same manner as the battery A1 of Embodiment 1, except that when positive electrodes were fabricated, the contents of zinc oxide mixed into positive slurry were set at 0, 0.1, 0.2, 2.0, 3.0 and 5.0 parts by weight as shown in TABLE 1.

Comparative Examples 7 to 17

Nickel hydrogen rechargeable batteries (batteries K1, L1, M1, N1, O1, P1, Q1, R1, S1, T1 and U1) were assembled in the same manner as the battery A1 of Embodiment 1, except that when positive electrodes were fabricated, positive-electrode active material were produced without dissolving magnesium in nickel hydroxide, and the contents of zinc oxide mixed into positive slurry were set at 0, 0.1, 0.2, 0.3, 0.5, 1.0, 1.5, 2.0, 3.0, 5.0 and 9.0 parts by weight as shown in TABLE 1.

Embodiments 5 to 9

Nickel hydrogen rechargeable batteries (batteries A2, B2, C2, D2 and E2) were assembled in the same manner as the battery A1 of Embodiment 1, except that zinc oxide was not mixed into positive slurry when positive electrodes were fabricated; zinc oxide was mixed into negative slurry when negative electrodes were fabricated; and the contents of zinc oxide mixed into the negative slurry were set at 0.2, 0.3, 0.5, 1.0 and 1.5 parts by weight per 100 parts by weight of hydrogen storage alloy as shown in TABLE 2.

Comparative Examples 18 to 22

Nickel hydrogen rechargeable batteries (batteries F2, G2, H2, I2 and J2) were assembled in the same manner as the battery A2 of Embodiment 5, except that when negative electrodes were fabricated, the contents of zinc oxide mixed into negative slurry were set at 0, 0.1, 2.0, 3.0 and 5.0 parts by weight as shown in TABLE 2.

Comparative Examples 23 to 33

Nickel hydrogen rechargeable batteries (batteries K2, L2, M2, N2, O2, P2, Q2, R2, S2, T2 and U2) were assembled in the same manner as the battery A2 of Embodiment 5, except that when positive electrodes were fabricated, positive-electrode active material was produced without dissolving magnesium in nickel hydroxide, and the contents of zinc oxide mixed into negative slurry were set at 0, 0.1, 0.2, 0.3, 0.5, 1.0, 1.5, 2.0, 3.0, 5.0 and 9.0 parts by weight as shown in TABLE 2.

2. Evaluation of Nickel Hydrogen Rechargeable Batteries (1) Initial Activation Processing Initial activation processing was conducted twice, in which the batteries A1 to U1 and A2 to U2 were charged at a charging current of 0.1 C for 16 hours under a temperature of 25° C., and then stored at a discharging current of 0.2 C until battery voltage reaches 0.5 V.

(2) Amount of Decrease in Operating Voltage after the Batteries are Stored

The batteries A1 to U1 and A2 to U2 that had undergone the initial activation processing were measured in discharge capacity at a time point after being charged at a current of 1.0 C for one hour under atmosphere at a temperature of 25° C., and then discharged at a current of 1.0 C under the same atmosphere until battery voltage reaches 0.8 V. The battery voltage at the midpoint of the entire discharge time was obtained as initial operating voltage.

Furthermore, the batteries were measured in discharge capacity at the time point after being charged at a current of 1.0 C for one hour under atmosphere at a temperature of 25° C. and preserved for one month under atmosphere at a temperature of 60° C. (corresponding to one-year preservation under room temperature), and then discharged at a current of 1.0 C under atmosphere at a temperature of 25° C. until battery voltage reaches 0.8 V. The battery voltage at the midpoint of the entire discharge time was obtained as after-storage operating voltage. The amount of decrease in after-storage operating voltage (mV) indicated by (II) expression was obtained.

The amount of decrease in after-storage operating voltage=(after-storage operating voltage)−(initial operating voltage) (II)

Results are shown under the amount of decrease in after-storage operating voltage in TABLES 1 and 2.

Figure 2:
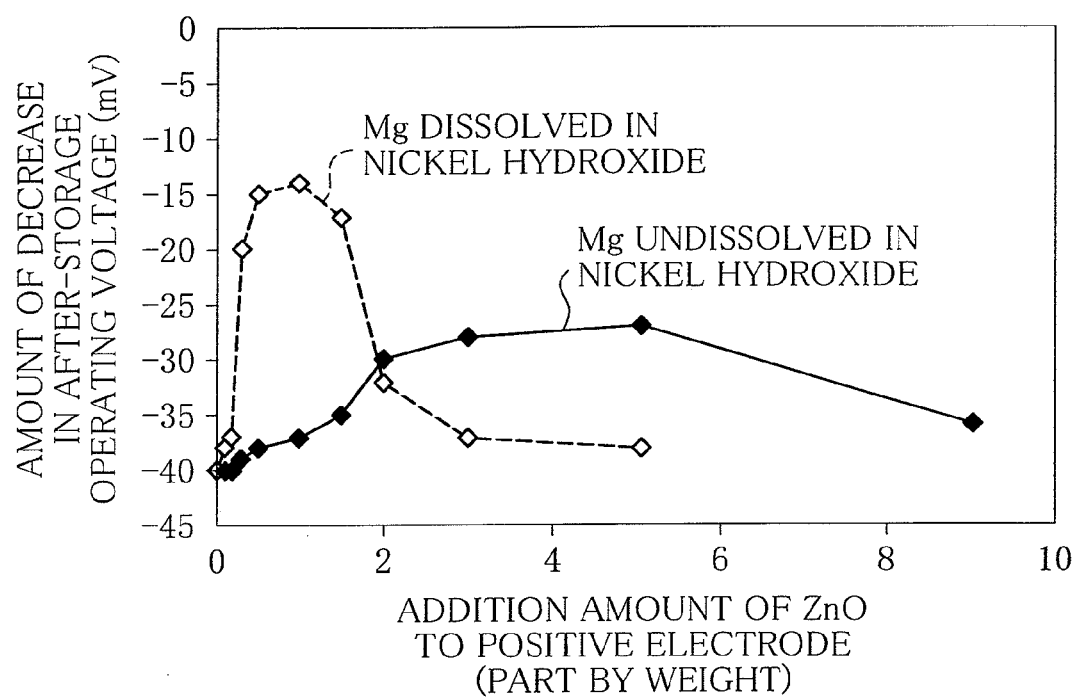
FIG. 2 is a graph showing relationship between an addition amount of zinc oxide added to a positive electrode and the amount of decrease in operating voltage after a battery is stored.

Regarding the batteries A1 to J1 in which magnesium was dissolved in the positive electrodes (magnesium was dissolved in the nickel hydroxide particles) and the batteries K1 to U1 in which magnesium was not dissolved in the positive electrodes (magnesium was not dissolved in the nickel hydroxide particles), relationship between the addition amount of zinc oxide serving as positive additive and the amount of decrease in operating voltage was obtained on the basis of TABLE 1. The obtained results are shown in FIG. 2.

Figure 3:
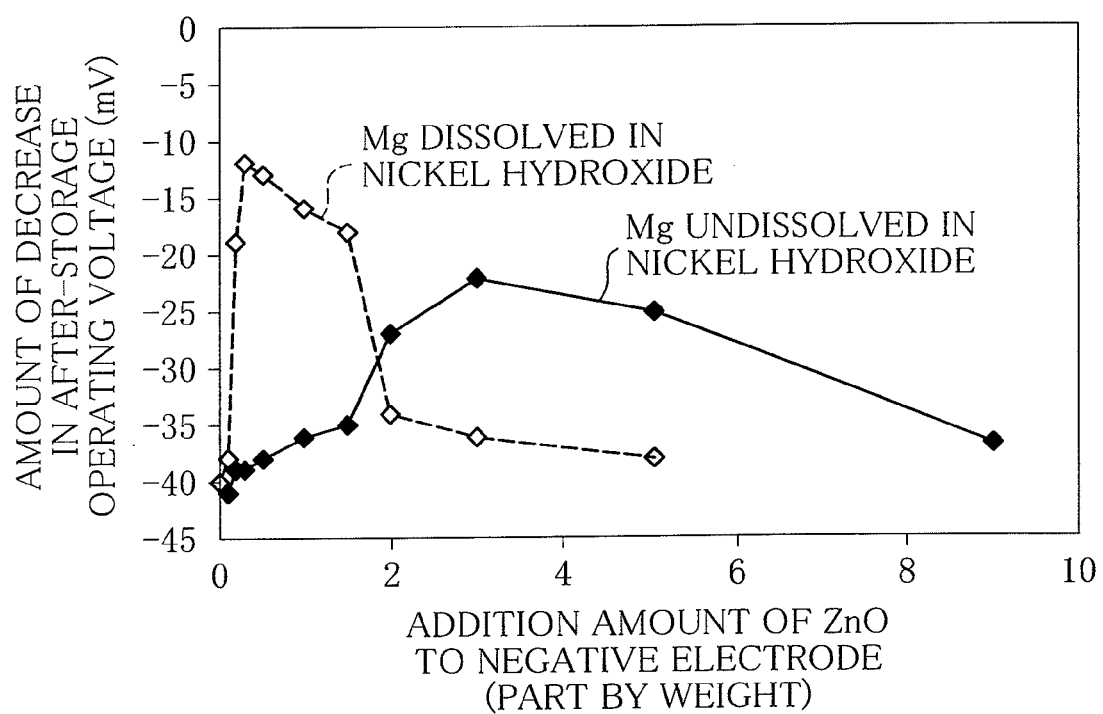
FIG. 3 is a graph showing relationship between an addition amount of zinc oxide added to a negative electrode and the amount of decrease in operating voltage after a battery is stored.

Moreover, regarding the batteries A2 to J2 in which magnesium was dissolved in the positive electrodes (magnesium was dissolved in the nickel hydroxide particles) and the batteries K2 to U2 in which magnesium was not dissolved in the positive electrodes (magnesium was not dissolved in the nickel hydroxide particles), relationship between the addition amount of zinc oxide serving as negative additive and the amount of decrease in operating voltage was obtained. The obtained results are shown in FIG. 3.

TABLE 1

|  | Battery | Positive electrode | Amount of ZnO added to positive electrode (part by weight) | Amount of decrease in after-storage operating voltage (mV) |
| --- | --- | --- | --- | --- |
| Embodiment 1 | A1 | Mg dissolved | 0.3 | −20 |
| Embodiment 2 | B1 | Mg dissolved | 0.5 | −15 |
| Embodiment 3 | C1 | Mg dissolved | 1.0 | −14 |
| Embodiment 4 | D1 | Mg dissolved | 1.5 | −17 |
| Comparative Example 1 | E1 | Mg dissolved | 0 | −40 |
| Comparative Example 2 | F1 | Mg dissolved | 0.1 | −38 |
| Comparative Example 3 | G1 | Mg dissolved | 0.2 | −37 |
| Comparative Example 4 | H1 | Mg dissolved | 2.0 | −32 |
| Comparative Example 5 | I1 | Mg dissolved | 3.0 | −37 |
| Comparative Example 6 | J1 | Mg dissolved | 5.0 | −38 |
| Comparative Example 7 | K1 | Mg undissolved | 0 | −40 |
| Comparative Example 8 | L1 | Mg undissolved | 0.1 | −40 |
| Comparative Example 9 | M1 | Mg undissolved | 0.2 | −40 |
| Comparative Example 10 | N1 | Mg undissolved | 0.3 | −39 |
| Comparative Example 11 | O1 | Mg undissolved | 0.5 | −38 |
| Comparative Example 12 | P1 | Mg undissolved | 1.0 | −37 |
| Comparative Example 13 | Q1 | Mg undissolved | 1.5 | −35 |
| Comparative Example 14 | R1 | Mg undissolved | 2.0 | −30 |
| Comparative Example 15 | S1 | Mg undissolved | 3.0 | −28 |
| Comparative Example 16 | T1 | Mg undissolved | 5.0 | −27 |
| Comparative Example 17 | U1 | Mg undissolved | 9.0 | −36 |

TABLE 2

|  | Battery | Positive electrode | Amount of ZnO added to negative electrode (part by weight) | Amount of decrease in after-storage operating voltage (mV) |
| --- | --- | --- | --- | --- |
| Embodiment 5 | A2 | Mg dissolved | 0.2 | −19 |
| Embodiment 6 | B2 | Mg dissolved | 0.3 | −12 |
| Embodiment 7 | C2 | Mg dissolved | 0.5 | −13 |
| Embodiment 8 | D2 | Mg dissolved | 1.0 | −16 |
| Embodiment 9 | E2 | Mg dissolved | 1.5 | −18 |
| Comparative Example 18 | F2 | Mg dissolved | 0 | −40 |

TABLE 2-continued

| Battery | | Positive electrode | Amount of ZnO added to negative electrode (part by weight) | Amount of decrease in after-storage operating voltage (mV) |
|---|---|---|---|---|
| Comparative Example 19 | G2 | Mg dissolved | 0.1 | −38 |
| Comparative Example 20 | H2 | Mg dissolved | 2.0 | −34 |
| Comparative Example 21 | I2 | Mg dissolved | 3.0 | −36 |
| Comparative Example 22 | J2 | Mg dissolved | 5.0 | −38 |
| Comparative Example 23 | K2 | Mg undissolved | 0 | −40 |
| Comparative Example 24 | L2 | Mg undissolved | 0.1 | −41 |
| Comparative Example 25 | M2 | Mg undissolved | 0.2 | −39 |
| Comparative Example 26 | N2 | Mg undissolved | 0.3 | −39 |
| Comparative Example 27 | O2 | Mg undissolved | 0.5 | −38 |
| Comparative Example 28 | P2 | Mg undissolved | 1.0 | −36 |
| Comparative Example 29 | Q2 | Mg undissolved | 1.5 | −35 |
| Comparative Example 30 | R2 | Mg undissolved | 2.0 | −27 |
| Comparative Example 31 | S2 | Mg undissolved | 3.0 | −22 |
| Comparative Example 32 | T2 | Mg undissolved | 5.0 | −25 |
| Comparative Example 33 | U2 | Mg undissolved | 9.0 | −37 |

(3) Results Shown in TABLE 1 and FIG. 2

The following matters are evident in TABLE 1 and FIG. 2. In the case of the batteries in which magnesium was dissolved in the positive electrodes (nickel hydroxide), the effect of preventing the decrease of after-storage operating voltage, which was produced by the addition of zinc oxide to the positive electrodes, was noticeable when the addition amount of zinc oxide added to 100 parts by weight of nickel hydroxide was set at 0.3 to 1.5 part by weight.

A possible reason is that the formation of magnesium hydroxide on the hydrogen storage alloy surface was prevented because of a synergistic effect that was produced by the fact that magnesium was prevented from being eluted from the hydrogen storage alloy of the negative electrodes since the magnesium was dissolved in the nickel hydroxide of the positive electrodes and the fact that the zinc oxide (positive additive) added to the positive electrodes captured the magnesium.

In the case of the batteries in which magnesium was not dissolved in the positive electrodes (nickel hydroxide), the effect of preventing the decrease of after-storage operating voltage, which was produced by the addition of zinc oxide to the positive electrodes, was seen when the addition amount of zinc oxide added to 100 parts by weight of nickel hydroxide was set at 2.0 to 5.0 parts by weight, but the effect was not sufficient.

A possible reason is described below. If magnesium is not dissolved in the nickel hydroxide of the positive electrodes, magnesium is preferentially eluted from the hydrogen storage alloy into the electrolyte. It can be considered that, although zinc oxide (positive additive) is added to the positive electrodes, the additive fails to capture the magnesium eluted into the electrolyte, so that magnesium hydroxide is formed on the hydrogen storage alloy surface. As the result, the operating voltage of the batteries is decreased, and accordingly, the effect of preventing the decrease of operating voltage is not really exerted.

(4) Results shown in TABLE 2 and FIG. 3

TABLE 2 and FIG. 3 clearly show the following matters. In the case of the batteries in which magnesium was dissolved in the positive electrodes (nickel hydroxide), the effect of preventing the decrease of after-storage operating voltage, which was produced by the addition of zinc oxide into the negative electrodes, was noticeable when the addition amount of zinc oxide added to 100 parts by weight of hydrogen storage alloy is set at 0.2 to 1.5 part by weight.

A possible reason is that the formation of magnesium hydroxide on the hydrogen storage alloy surface was prevented because of a synergistic effect produced by the fact that magnesium was prevented from being eluted from the hydrogen storage alloy of the negative electrodes since the magnesium was dissolved in the nickel hydroxide of the positive electrodes and the fact that the zinc oxide (negative additive) added to the negative electrodes captured the magnesium.

It is apparent that a lower limit amount (0.2 part by weight) at which the addition of zinc oxide added to the negative electrodes exerts the effect is less than a lower limit amount (0.3 part by weight) at which the addition of zinc oxide added to the positive electrodes exerts the effect. In general, nickel hydrogen rechargeable batteries are designed so that a negative electrode has higher capacity than a positive electrode, so that the amount of hydrogen storage alloy of the negative electrode is larger than the amount of active material of the positive electrode. In this light, it can be considered that, even if the positive and negative electrodes are actually added with the same amount of additives, the negative electrode is lower than the positive electrode in percentage of the additive in an electrode plate.

In the case of the batteries in which magnesium was not dissolved in the positive electrodes (nickel hydroxide), the effect of preventing the decrease of after-storage operating voltage, which was produced by the addition of zinc oxide to the negative electrodes, was seen when the addition amount of zinc oxide added to 100 parts by weight of hydrogen storage alloy was set at 2.0 to 5.0 parts by weight, but the effect was not sufficient.

The following is a possible reason. If magnesium is not dissolved in the nickel hydroxide of the positive electrodes, the magnesium is preferentially eluted from the hydrogen storage alloy into the electrolyte. It can be considered that, although zinc oxide (negative additive) is added to the negative electrodes, the additive fails to capture the magnesium eluted into the electrolyte, so that magnesium hydroxide is formed on the hydrogen storage alloy surface. As the result, the operating voltage is decreased, and accordingly, the effect of preventing the decrease of the operating voltage is not really exerted.

(5) With the synergistic effect produced by the fact that magnesium is dissolved in the nickel hydroxide of the positive electrodes and the fact that zinc oxide serving as additive is added to the positive or negative electrodes, the nickel hydrogen rechargeable battery of the invention can provide a significant effect in preventing the decrease of operating voltage with a small addition amount of zinc oxide, as compared to the batteries in which magnesium is not dissolved in the nickel hydroxide of the positive electrodes. In this view, the invention has an exceedingly high industrial value.

According to the embodiments, zinc oxide serving as additive is added to either one of the positive and negative electrodes. However, the effect is the same as in the case where zinc oxide is added to both the positive and negative electrodes.

Although the embodiments use zinc oxide as additive, the same effect can be achieved if the additive is zinc (metal zinc), zinc carbonate, zinc sulfate or zinc hydroxide. This is because zinc and zinc compounds exhibit effects by being dissolved in alkaline electrolyte and therefore are not affected by an initial addition form.

The invention is not limited to the above aspects and embodiments and may be modified in various ways. For example, the nickel hydrogen rechargeable battery may be a rectangular battery, and there is no particular limitation in mechanical structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nickel hydrogen rechargeable battery in which an electrode group is airtightly contained in a container together with alkaline electrolyte, and the electrode group is formed of a separator, a negative electrode and a positive electrode, wherein:

the negative electrode includes:
hydrogen storage alloy having a composition indicated by a general formula, $Ln_{1-w}Mg_wNi_xAl_yT_z$, wherein Ln represents at least one element selected from lanthanoid, Ca, Sr, Sc, Y, Ti, Zr and Hf; T represents at least one element selected from V, Nb, Ta, Cr, Mo, Mn, Fe, Co, Ga, Zn, Sn, In, Cu, Si, P and B; and subscripts w, x, y and z represent $0<w\leq1$, $2.80\leq x\leq3.50$, $0.10\leq y\leq0.25$, and $0\leq z\leq0.5$, respectively;

the positive electrode contains:
positive-electrode active material including nickel hydroxide in which magnesium is dissolved;
at least either one of the negative and positive electrodes further contains as an additive zinc oxide;
the content of the additive:
ranges from 0.2 to 1.5 part by weight per 100 parts by weight of the hydrogen storage alloy in the negative electrode, and
ranges from 0.3 to 1.5 part by weight per 100 parts by weight of the positive-electrode active material in the positive electrode.

2. The nickel hydrogen rechargeable battery according to claim 1, wherein:
at least either one of cobalt and zinc is further dissolved in the nickel hydroxide.

* * * * *